US012103632B2

(12) United States Patent
Song et al.

(10) Patent No.: US 12,103,632 B2
(45) Date of Patent: Oct. 1, 2024

(54) PERSONAL MOBILITY AND CONTROL METHOD THEREOF

(71) Applicants: Hyundai Motor Company, Seoul (KR); Kia Corporation, Seoul (KR)

(72) Inventors: Ilsun Song, Seongnam-si (KR); Donghee Seok, Suwon-si (KR); Duck Young Kim, Seongnam-si (KR); Hee Jin Ro, Seoul (KR); Yocheol Jang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 526 days.

(21) Appl. No.: 17/464,129

(22) Filed: Sep. 1, 2021

(65) Prior Publication Data

US 2022/0185421 A1 Jun. 16, 2022

(30) Foreign Application Priority Data

Dec. 11, 2020 (KR) .................. 10-2020-0173314

(51) Int. Cl.
*B62K 21/14* (2006.01)
*B62K 3/00* (2006.01)
*B62K 21/16* (2006.01)
*B62K 21/20* (2006.01)

(52) U.S. Cl.
CPC ............. *B62K 21/14* (2013.01); *B62K 3/002* (2013.01); *B62K 21/16* (2013.01); *B62K 21/20* (2013.01); *B62K 2202/00* (2013.01)

(58) Field of Classification Search
CPC ........ B62K 21/14; B62K 21/16; B62K 21/20; B62K 21/08; B62K 21/00; B62K 3/002; B62K 2202/00; B62J 45/412; B62J 45/414; B62J 45/41; F16F 9/12; F16F 9/535; B62D 1/02
USPC ....................................... 701/41, 43
See application file for complete search history.

(56) References Cited

FOREIGN PATENT DOCUMENTS

| CN | 110155171 | * | 8/2019 | ............. B62D 11/04 |
| JP | 2004516980 | * | 6/2004 | ............. B60K 41/20 |
| JP | 2004276727 | * | 10/2004 | ........... B62K 11/007 |

* cited by examiner

*Primary Examiner* — Hai H Huynh
(74) *Attorney, Agent, or Firm* — Morgan, Lewis & Bockius LLP

(57) ABSTRACT

A personal mobility and a control method thereof may include a main body, a steering shaft rotatably coupled to the main body, a steering limiting device configured to limit rotation of the steering shaft, a posture sensor provided to detect a change in posture of the main body, and a controller configured to selectively generate a control signal to control an operation of the steering limiting device to limit the rotation of the steering shaft when the controller determines that the posture of the main body changes at a speed exceeding a predetermined speed.

14 Claims, 12 Drawing Sheets

PERSONAL MOBILITY AND CONTROL METHOD THEREOF

CROSS-REFERENCE TO RELATED APPLICATION(S)

The present application claims priority to Korean Patent Application No. 10-2020-0173314, filed on Dec. 11, 2020, in the Korean Intellectual Property Office, the entire contents of which is incorporated herein for all purposes by this reference.

BACKGROUND OF THE INVENTION

Field of the Invention

The present invention relates to a personal mobility equipped with a steering limiting device capable of limiting steering in an emergency situation and a control method thereof.

Description of Related Art

As used throughout the present application, the phrase "personal mobility" is directed to mean any moving personal vehicle, device, machine, instrument, apparatus, or the like. Recently, the use of a personal mobility such as an electric kickboard, an electric wheel, and an electric bicycle is expanding. The personal mobility may drive on roadways, sidewalks, narrow alleys, and the like by electric power, and may be used as a means of transportation or leisure for moving a short distance.

The personal mobility includes a steering device for driving control. However, in such the personal mobility, a main body may rotate around a steering axis in an emergency situation and strike the legs of a user or the like, resulting in injury. In an emergency situation of sudden braking or tripping over an obstacle while driving, the user may often hold a steering handle. However, in the instant case, as the main body rotates rapidly around the steering axis due to inertia, the main body may strike the legs of the user and cause injury.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a personal mobility configured for limiting steering in a situation in which a posture of a main body changes rapidly and a control method thereof.

Additional various aspects of the present invention will be set forth in part in the description which follows, and in part, will be obvious from the description, or may be learned by practice of the present invention.

In accordance with an aspect of the present invention, a personal mobility includes a main body, a steering shaft rotatably coupled to the main body, a steering limiting device configured to limit rotation of the steering shaft, a posture sensor provided to detect a change in posture of the main body, and a controller configured to selectively generate a control signal to control an operation of the steering limiting device to limit the rotation of the steering shaft when the controller determines that the posture of the main body changes at a speed exceeding a predetermined speed.

The steering limiting device may include a housing provided on a shaft support portion connected to the main body for rotatably supporting the steering shaft and enclosing a circumference of the steering shaft and having a fluid accommodating groove opened toward an external surface of the steering shaft, a magneto-rheological (MR) fluid accommodated in the fluid accommodating groove, one or more protrusions protruding from the external surface of the steering shaft and positioned in the fluid accommodating groove, and an excitation coil provided in the housing to selectively provide a magnetic field to the MR fluid according to the control signal of the controller.

The MR fluid may change into a solid property to limit the rotation of the steering shaft when a current is applied to the excitation coil according to the control signal of the controller to generate the magnetic field.

The controller may be configured to control the current applied to the excitation coil according to the detection of the posture sensor.

The steering limiting device may include a first locking portion provided in a concave-convex shape along a rotation direction of the steering shaft on an internal surface of a shaft support portion for supporting an external surface of the steering shaft, one or more locking members provided inside the steering shaft to be movable forwards or backwards in a radial direction of the steering shaft and including a second locking portion provided to be correspondingly caught on the first locking portion, one or more pressing springs provided to press the one or more locking members toward the first locking portion, a rotation member rotatably provided in the steering shaft, one or more traction wires provided to connect the rotation member and the one or more locking members and configured for pulling the one or more locking members by a rotation of the rotation member, and a driving motor provided in the steering shaft and to rotate the rotation member fixed to the driving motor in a forward or reverse direction according to the control signal of the controller.

The controller may be configured to control the operation of the driving motor based on the detection of the posture sensor.

The steering limiting device may include a first locking portion provided in a concave-convex shape along a rotation direction of the steering shaft on an internal surface of a shaft support portion for supporting an external surface of the steering shaft, one or more locking members provided inside the steering shaft to be movable forwards or backwards in a radial direction of the steering shaft and including a second locking portion provided to be correspondingly caught on the first locking portion, a rotation member rotatably provided in the steering shaft and provided with one or more cam surfaces on an external surface of the rotation member to move the one or more locking members forwards and backwards during rotation, one or more pressing springs provided to press the one or more locking members toward the one or more cam surfaces of the rotation member to separate the first locking portion and the second locking portion from each other, and a driving motor provided in the steering shaft and to rotate the rotation member fixed to the driving motor in a forward or reverse direction according to the control signal of the controller.

The steering limiting device may include a housing provided on a shaft support portion connected to the main body for rotatably supporting the steering shaft and enclosing a circumference of the steering shaft and having a fluid accommodating groove opened toward an external surface of the steering shaft, a viscoelastic fluid accommodated in the fluid accommodating groove, one or more braking wings provided outside the steering shaft to be positioned within the fluid accommodating groove and configured for rotating such that opposite side surfaces thereof face a rotation direction of the steering shaft or face a direction of intersecting the rotation direction of the steering shaft, and a driving device provided in the steering shaft to rotate the one or more braking wings under a braking condition or a braking release condition.

The one or more braking wings may include a first braking wing and a second braking wing provided on opposite sides of the steering shaft, respectively, and the driving device may include first and second wing shafts extend toward a center portion of the steering shaft from the first and second braking wings, respectively, to be rotatably supported on the steering shaft, a first driven gear fixed to the first wing shaft and provided in a gear chamber inside the steering shaft, a second driven gear coupled to the second wing shaft and provided in the gear chamber, a driving gear provided in the gear chamber to be engaged with the first and second driven gears, and a driving motor provided in the steering shaft to rotate the driving gear in a forward or reverse direction thereof.

In accordance with an aspect of the present invention, a control method of a personal mobility, which includes a steering limiting device configured to limit rotation of a steering shaft, and a posture sensor provided to detect a change in posture of a main body, includes determining whether the posture of the main body changes at a speed exceeding a predetermined speed based on the detection of the posture sensor, and controlling the operation of the steering limiting device to limit the rotation of the steering shaft when the controller determines that the posture of the main body changes at a speed exceeding the predetermined speed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
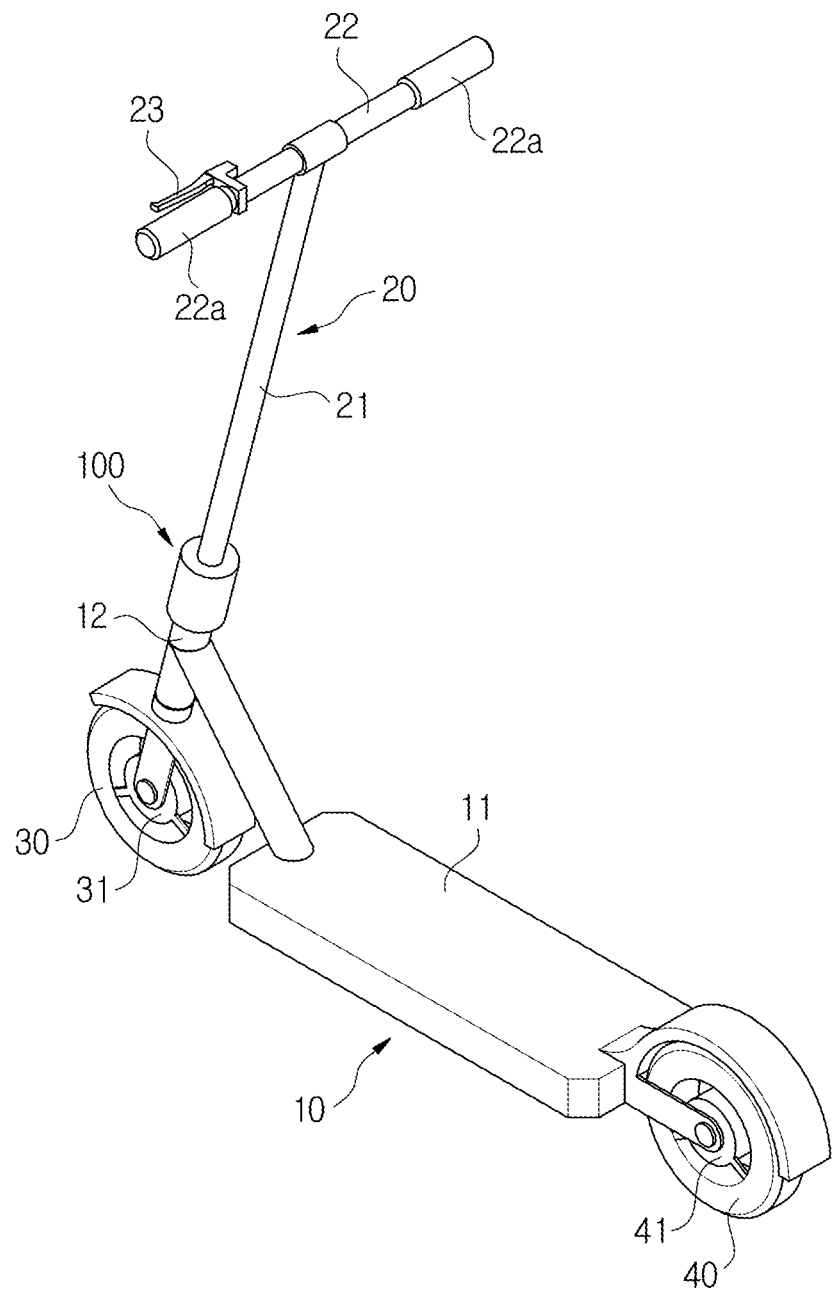
FIG. 1 is a perspective view of a personal mobility to which a steering limiting device according to various exemplary embodiments of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter embodiments of the present invention will be described in detail with reference to the accompanying drawings. The exemplary embodiments described below are provided by way of example so that those skilled in the art will be able to fully understand the spirit of the present invention. The present invention is not limited to the exemplary embodiments described below, but may be embodied in other forms. To clearly explain the present invention, parts not related to the description are omitted from the drawings, and the width, length, thickness, etc. of the components may be exaggerated for convenience.

Figure 2:
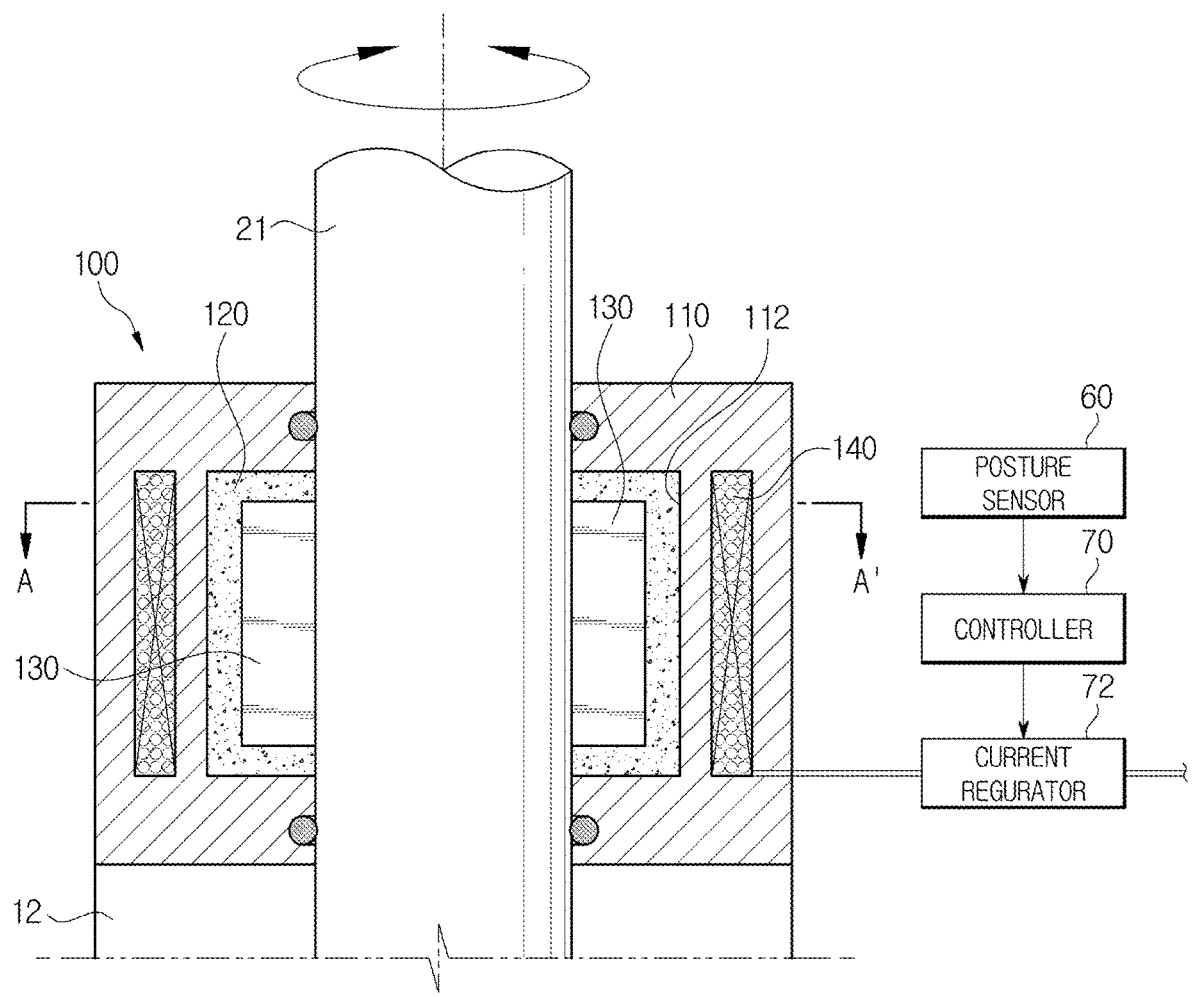
FIG. 2 is a cross-sectional view of the steering limiting device of the personal mobility according to the various exemplary embodiments of the present invention.
Figure 3:
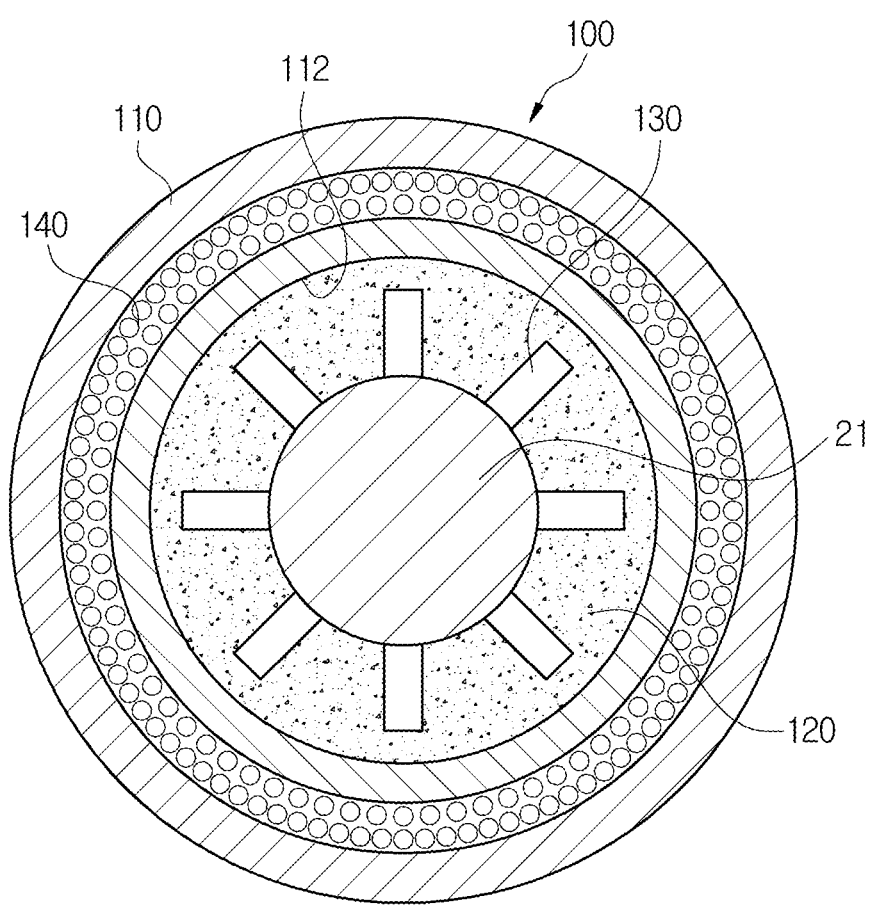
FIG. 3 is a cross-sectional view taken along line A-A' in FIG. 2.

FIG. 1, FIG. 2, and FIG. 3 illustrate a personal mobility to which a steering limiting device according to various exemplary embodiments of the present invention is applied.

Referring to FIG. 1, a personal mobility, to which a steering limiting device 100 of various exemplary embodiments are mounted, may include a main body 10 provided with a footrest 11 on an upper end portion thereof, a steering device 20 provided in front of the main body 10, a front wheel 30 provided at a lower end portion of the steering device 20, and a rear wheel 40 provided at a rear end portion of the main body 10.

The front wheel 30 and the rear wheel 40 may include driving motors 31 and 41 for driving and braking devices for braking, respectively. The main body 10 may include a battery for supplying power to the driving motors 31 and 41 of the front wheel 30 and the rear wheel 40.

The steering device 20 includes a steering shaft 21 rotatably provided on a shaft support portion 12 of a front end portion of the main body 10, and a steering handle 22 connected to an upper end portion of the steering shaft 21 and provided with a grip portion 22a at opposite sides. An operation member configured for controlling driving and a brake lever 23 configured for controlling braking may be provided on any one of the grip portions 22a of the steering handle 22.

The steering limiting device 100 may be provided at a portion in which the shaft support portion 12 and the steering shaft 21 are connected in front of the main body 10 to limit the rotation of the steering shaft 21 in an emergency situation in which a posture of the main body 10 changes rapidly. As illustrated in FIG. 2, the personal mobility according to the various exemplary embodiments may include a posture sensor 60 configured for detecting a change in posture of the main body 10, and a controller 70 provided to control the operation of the steering limiting device 100 based on detection information of the posture sensor 60.

Referring to FIG. 2 and FIG. 3, the steering limiting device 100 may include a housing 110, a fluid accommodating groove 112, a magneto-rheological (MR) fluid 120, a plurality of protrusions 130, and an excitation coil 140.

The housing 110 may be provided in a cylindrical shape and may be provided outside the steering shaft 21 to enclose a circumference of the steering shaft 21. A lower portion of the housing 110 is fixed to an upper portion of the shaft support portion 12 of the main body 10.

The fluid accommodating groove 112 is provided in a cylindrical shape in the housing 110 such that a side thereof facing an external surface of the steering shaft 21 inside the housing 110 is open.

The MR fluid 120 is filled in the fluid accommodating groove 112. The MR fluid 120 is a solution including magnetic particles such as fine iron powder in silicone oil or mineral oil. The MR fluid 120 changes into a solid property as the magnetic particles are disposed in a magnetic field direction when a magnetic field is applied, and changes into a fluid property as the magnetic particles are irregularly dispersed when the magnetic field is released.

The plurality of protrusions 130 protrudes in a form of a wing from the external surface of the steering shaft 21 to enter the inside of the fluid accommodating groove 112. Accordingly, the plurality of protrusions 130 rotates together with the steering shaft 21 in the fluid accommodating groove 112 filled with the MR fluid 120. The plurality of protrusions 130 may limit the rotation of the steering shaft 21 when the MR fluid 120 in the fluid accommodating groove 112 changes into a solid property.

As illustrated in FIG. 3, the various exemplary embodiments exemplify a case in which a plurality of protrusions 130 is radially provided on the external surface of the steering shaft 21, but the one or more protrusions 130 may be provided.

The excitation coil 140 may be provided around the fluid accommodating groove 112 of the housing 110 to provide a magnetic field to the MR fluid 120. The excitation coil 140 may provide a magnetic field to the MR fluid 120 when power is applied so that the MR fluid 120 changes into the solid property.

The steering limiting device 100 as described above may limit the rotation of the steering shaft 21 by constraining the plurality of protrusions 130 by the solidified MR fluid 120 when a current is applied to the excitation coil 140 to provide a magnetic field to the MR fluid 120.

The posture sensor 60 may be provided on the main body 10 or at a connection portion between the main body 10 and the steering shaft 21. The posture sensor 60 may detect a sudden change in posture of the main body 10 in an emergency situation such as sudden braking or tripping over an obstacle while driving. The posture sensor 60 may be a gyro sensor provided on the main body 10 to detect a change in posture of the main body 10 or a rotation sensor provided at the connection portion between the main body 10 and the steering shaft 21 to detect a relative rotation of the steering shaft 21. The posture sensor 60 may detect a phenomenon in which the main body 10 is rapidly tilted or the main body 10 is rapidly rotated around the steering shaft 21.

The controller 70 may control the current applied to the excitation coil 140 based on the detection information of the posture sensor 60. The controller 70 may control a current regulator 72 provided to control the supply of current to the excitation coil 140. That is, the controller 70 may control the operation of the steering limiting device 100 by controlling the current regulator 72 in a method of turning on/off the current to be applied to the excitation coil 140 or controlling the amount of current.

The controller 70 may determine whether the posture of the main body 10 suddenly changes beyond a set speed based on the detection of the posture sensor 60, and may control the operation of the steering limiting device 100 to limit the rotation of the steering shaft 21 when it is determined that the posture of the main body 10 changes at a speed exceeding the set speed. Herein, the set speed may be different depending on the size or type of the personal mobility.

The controller 70 may adjust a magnetic field strength of the excitation coil 140 by controlling the amount of current applied to the excitation coil 140, and thereby may control a degree of solidification of the MR fluid 120. Accordingly, the controller 70 may control the steering shaft 21 to rotate smoothly or stiffly in a response to a speed at which the posture of the main body 10 changes.

The personal mobility to which the steering limiting device 100 of the various exemplary embodiments are applied may prevent rapid rotation of the main body 10 with respect to the steering shaft 21, preventing damage such as injury to the user because the personal mobility may limit the rotation of the steering shaft 21 by detecting an emergency situation in which the main body 10 rapidly rotates around the steering shaft 21 due to sudden braking or an accident, etc.

Figure 4:
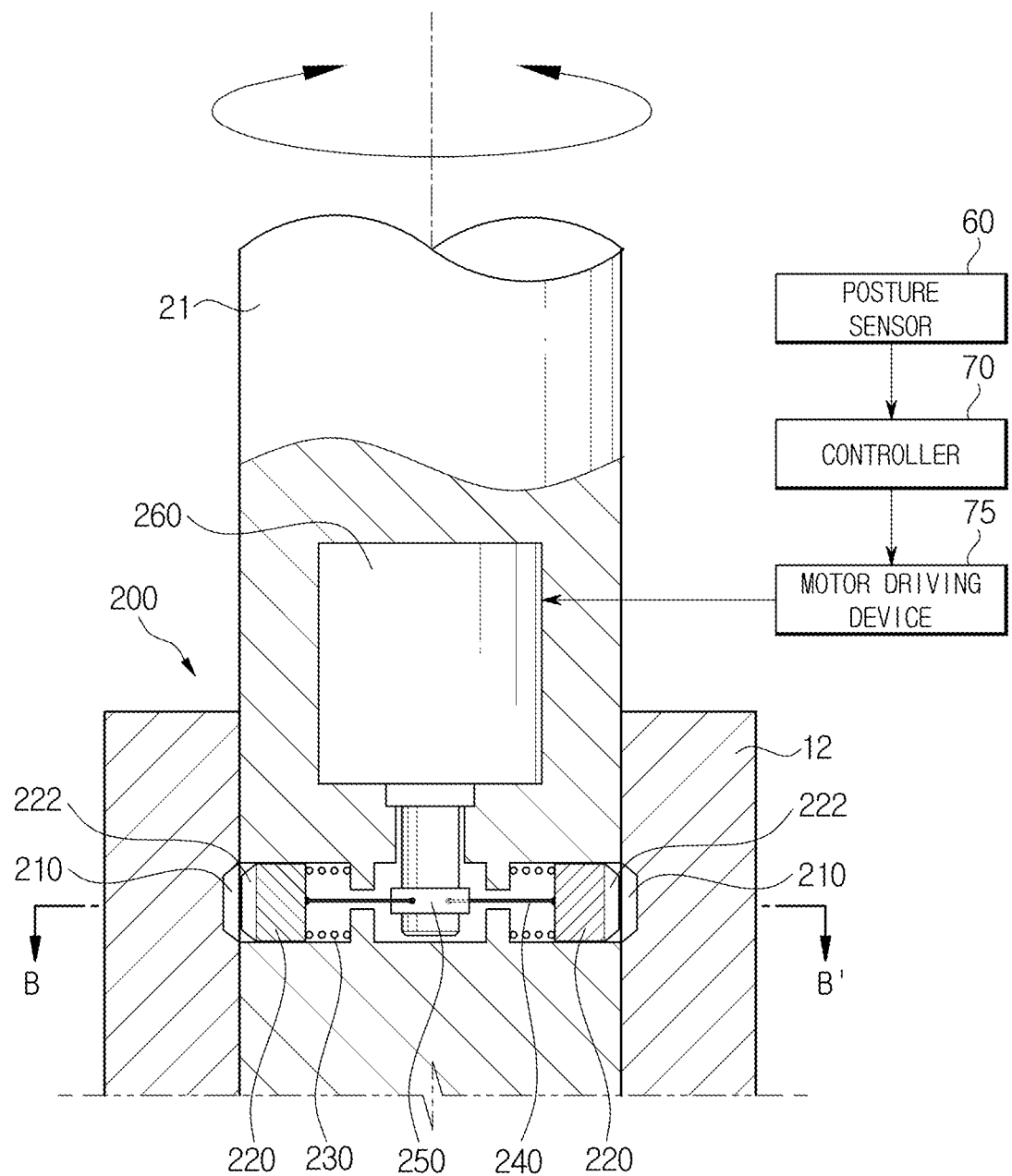
FIG. 4 is a cross-sectional view of a steering limiting device of a personal mobility according to various exemplary embodiments of the present invention.
Figure 5:
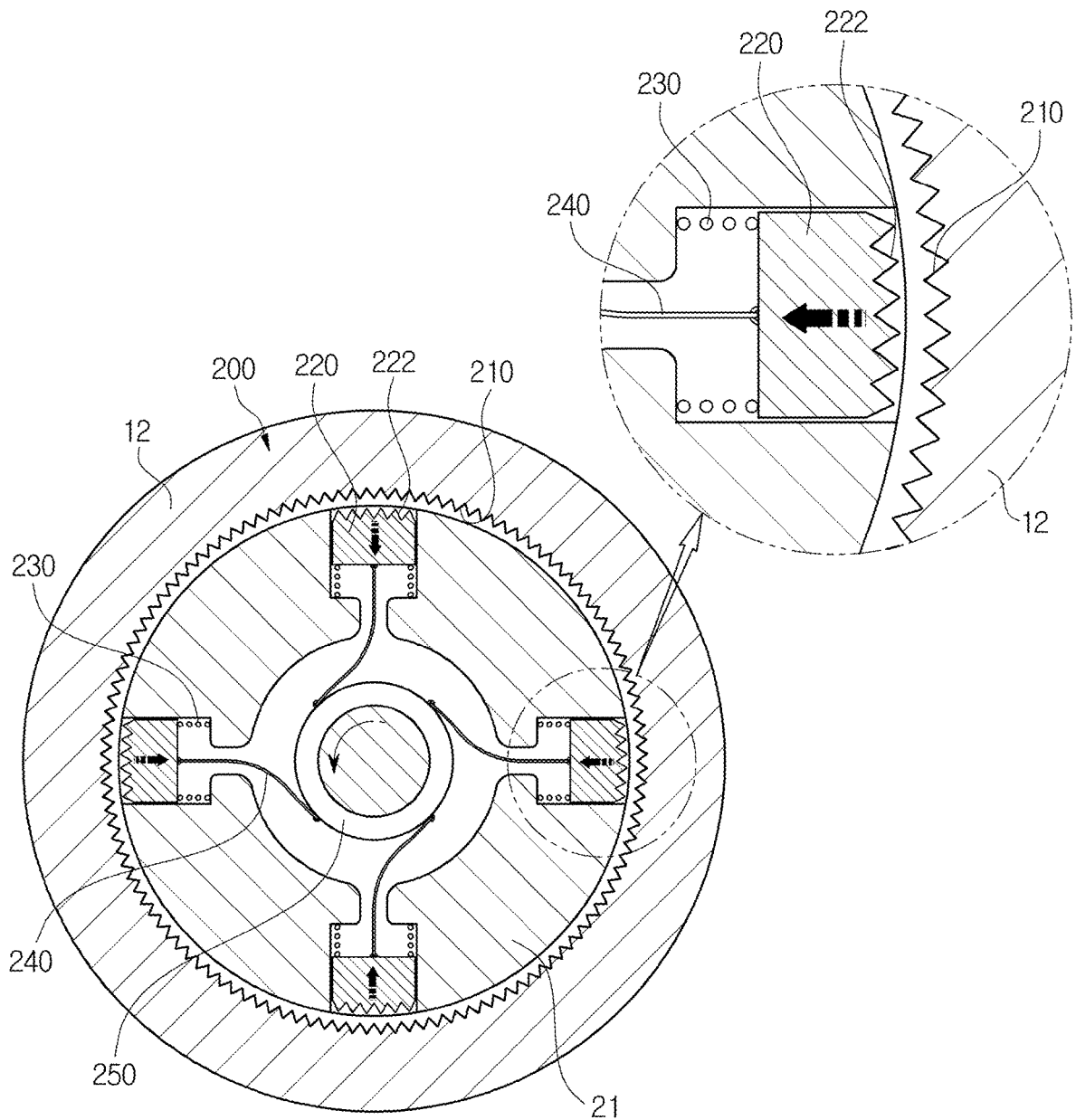
FIG. 5 is a cross-sectional view taken along line B-B' in FIG. 4, illustrating a state in which a steering shaft is rotatable.
Figure 6:
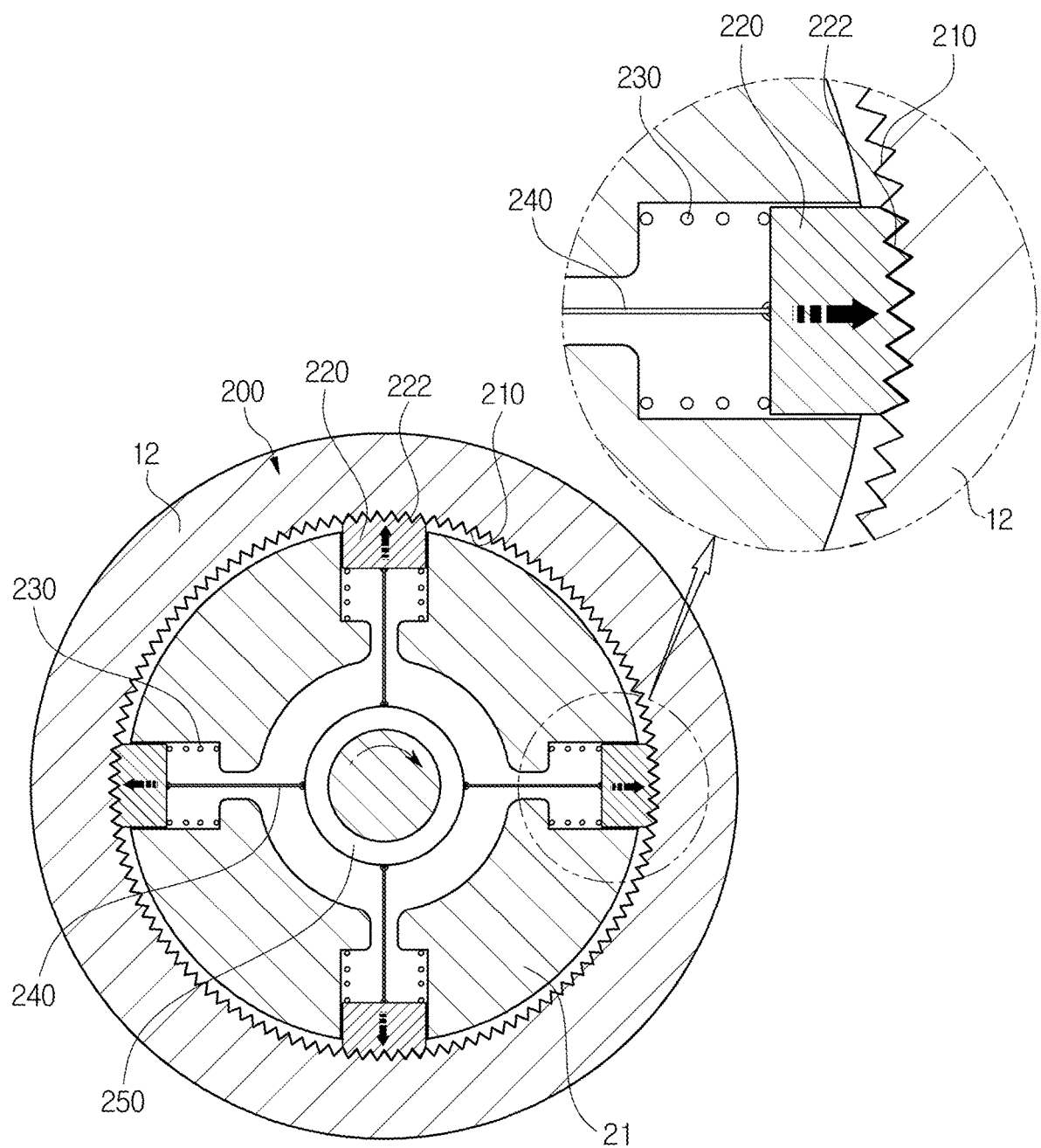
FIG. 6 is a cross-sectional view taken along line B-B' in FIG. 4, illustrating a state in which the rotation of the steering shaft is limited.

FIG. 4, FIG. 5 and FIG. 6 illustrate a steering limiting device 200 according to various exemplary embodiments. The steering limiting device 200 of the various exemplary embodiments may include a first locking portion 210, a plurality of locking members 220, a plurality of pressing springs 230, a plurality of traction wires 240, a rotation member 250, and a driving motor 260.

The first locking portion 210 is provided on an internal surface of the cylindrical shaft support portion 12 for rotatably supporting the steering shaft 21. The first locking portion 210 is continuously provided along a rotation direction of the steering shaft 21 and may be formed in a concave-convex shape (tooth shape).

The plurality of locking members 220 is provided inside the steering shaft 21 to be movable forwards or backwards in a radial direction thereof. The plurality of locking members 220 may be radially provided at intervals of 90 degrees. Each of the plurality of locking members 220 includes a second locking portion 222 provided in a shape corresponding to the first locking portion 210 to be correspondingly caught on the first locking portion 210 in a state of protruding from the steering shaft 21.

The plurality of pressing springs 230 is provided in grooves inside the steering shaft 21 in which the plurality of locking members 220 is provided, respectively. The plurality of pressing springs 230 may respectively press the plurality of locking members 220 toward the first locking portion 210 to protrude the plurality of locking members 220 to the outside of the steering shaft 21.

The rotation member 250 is rotatably provided in an internal space of the steering shaft 21, and the plurality of traction wires 240 connects the plurality of locking members 220 and an external surface of the rotation member 250, respectively. Accordingly, the rotation member 250 may simultaneously pull the plurality of locking members 220 in an inward direction of the steering shaft 21 by pulling the plurality of traction wires 240 by rotation thereof.

The driving motor 260 is provided in the steering shaft 21 and may rotate the rotation member 250 in a forward direction or a reverse direction for traction or traction release operation of the plurality of locking members 220.

In the steering limiting device 200 of the various exemplary embodiments of the present invention, as illustrated in FIG. 5, when the rotation member 250 rotates counterclockwise by the operation of the driving motor 260, the plurality of locking members 220 enters the inside of the steering shaft 21. Therefore, in the instant case, because the second locking portion 222 of each of the locking members 220 is maintained in a state of being spaced from the first locking portion 210, the steering shaft 21 may rotate. When the personal mobility is normally used, the steering limiting device 200 may maintain the state of FIG. 5.

In the steering limiting device 200, when an emergency such as a sudden rotation of the main body 10 occurs, as illustrated in FIG. 6, the rotation member 250 rotates clockwise by the operation of the driving motor 260 so that the plurality of locking members 220 protrudes to the outside of the steering shaft 21. Accordingly, in the instant case, as the second locking portion 222 of each of the locking members 220 is correspondingly coupled to the first locking portion 210, the rotation of the steering shaft 21 may be limited.

Although the various exemplary embodiments exemplify a case in which four of the locking members 220 are provided, the one or more locking members 220 may be provided. In the instant case, the one or more pressing springs 230 and traction wires 240 may be provided.

In the personal mobility of the various exemplary embodiments of the present invention, as illustrated in FIG. 4, the controller 70 may control the operation of the driving motor 260 by controlling the operation of a motor driving device 75 based on the detection of the posture sensor 60 provided on the main body 10 or the like of the personal mobility. Therefore, the personal mobility to which the steering limiting device 200 of the various exemplary embodiments are applied may also prevent rapid rotation of the main body 10 with respect to the steering shaft 21, preventing damage such as injury to the user because the personal mobility may limit the rotation of the steering shaft 21 by detecting an emergency situation in which the main body 10 rapidly rotates around the steering shaft 21 due to sudden braking or an accident, etc.

Figure 7:
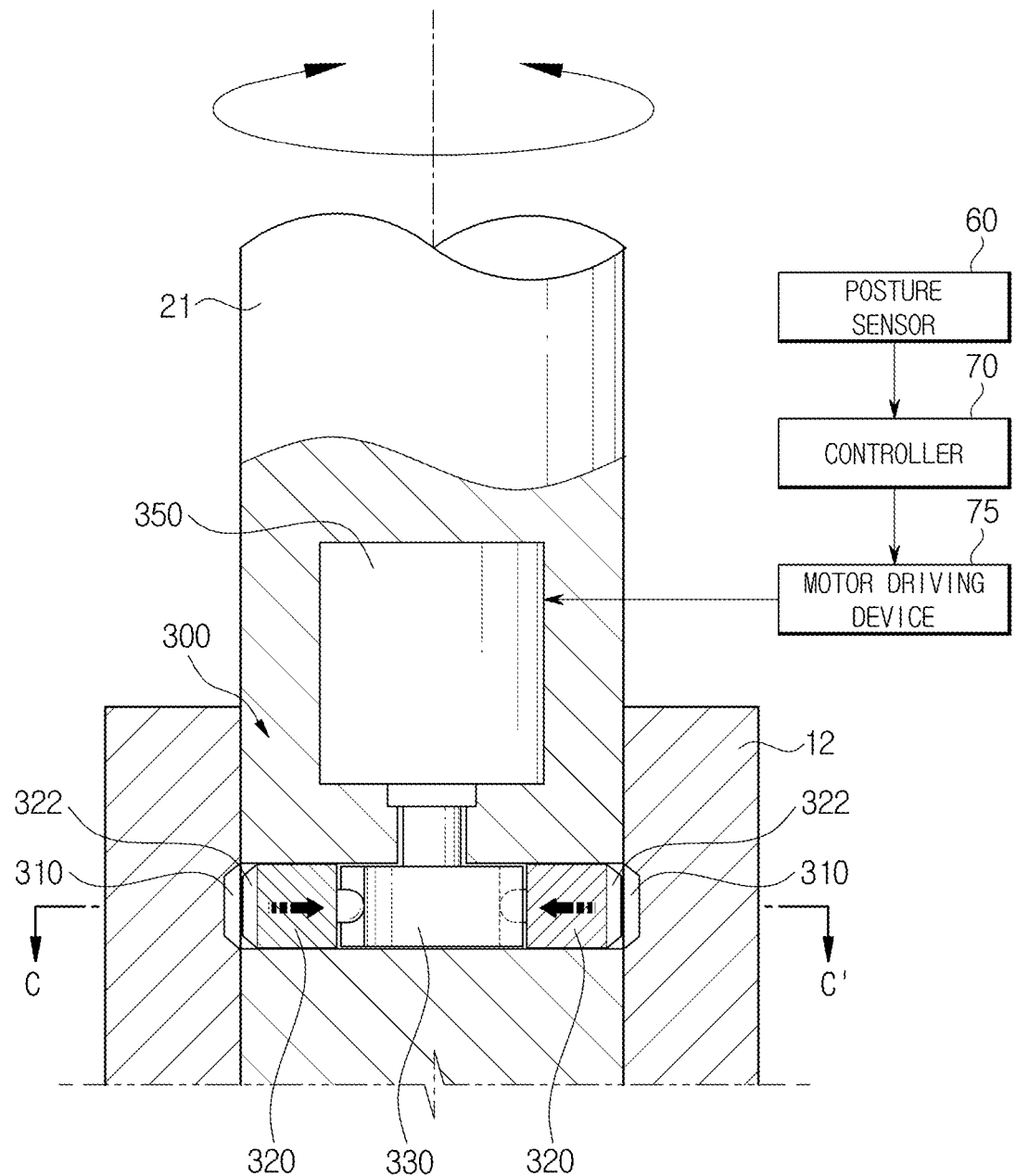
FIG. 7 is a cross-sectional view of a steering limiting device of a personal mobility according to various exemplary embodiments of the present invention.
Figure 8:
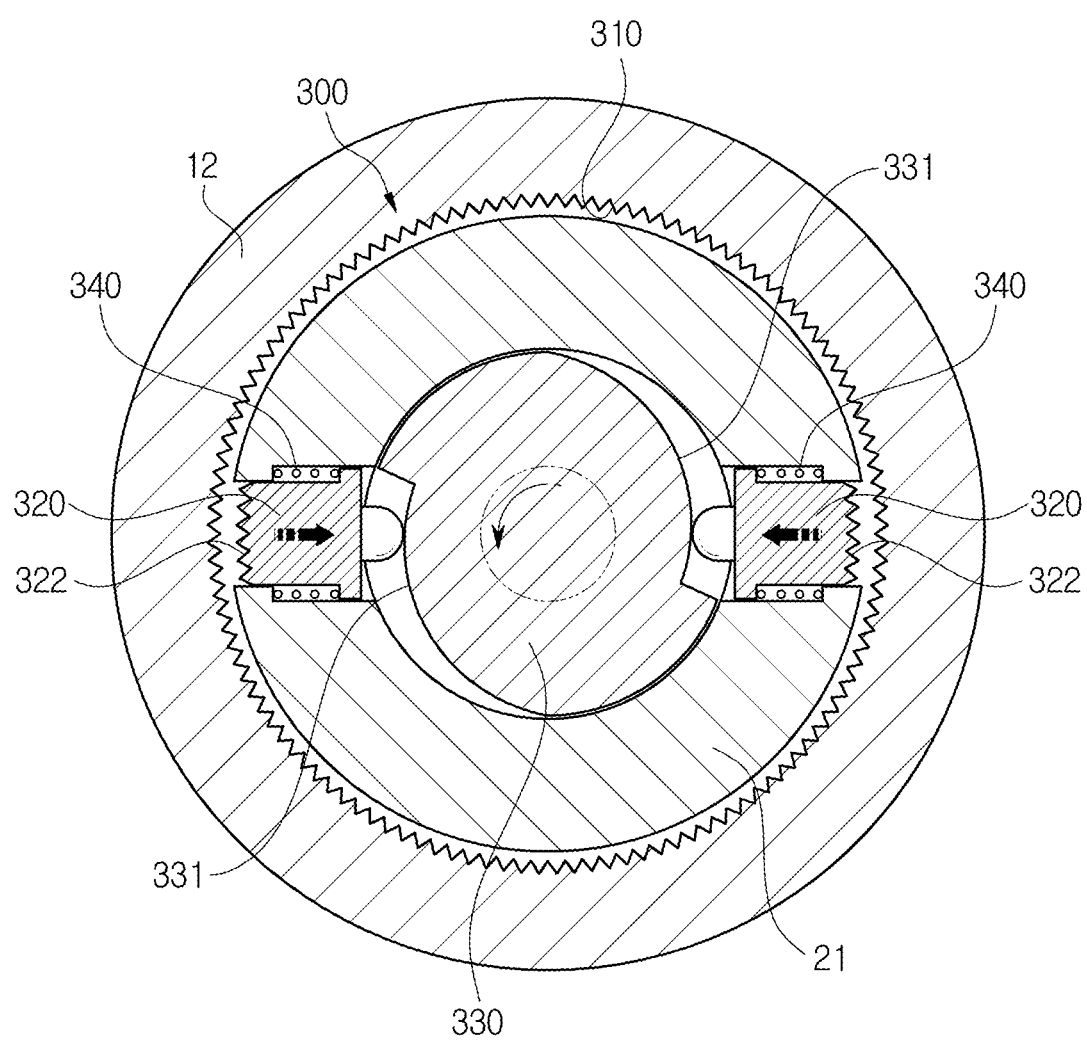
FIG. 8 is a cross-sectional view taken along line C-C' in FIG. 7, illustrating a state in which a steering shaft is rotatable.
Figure 9:
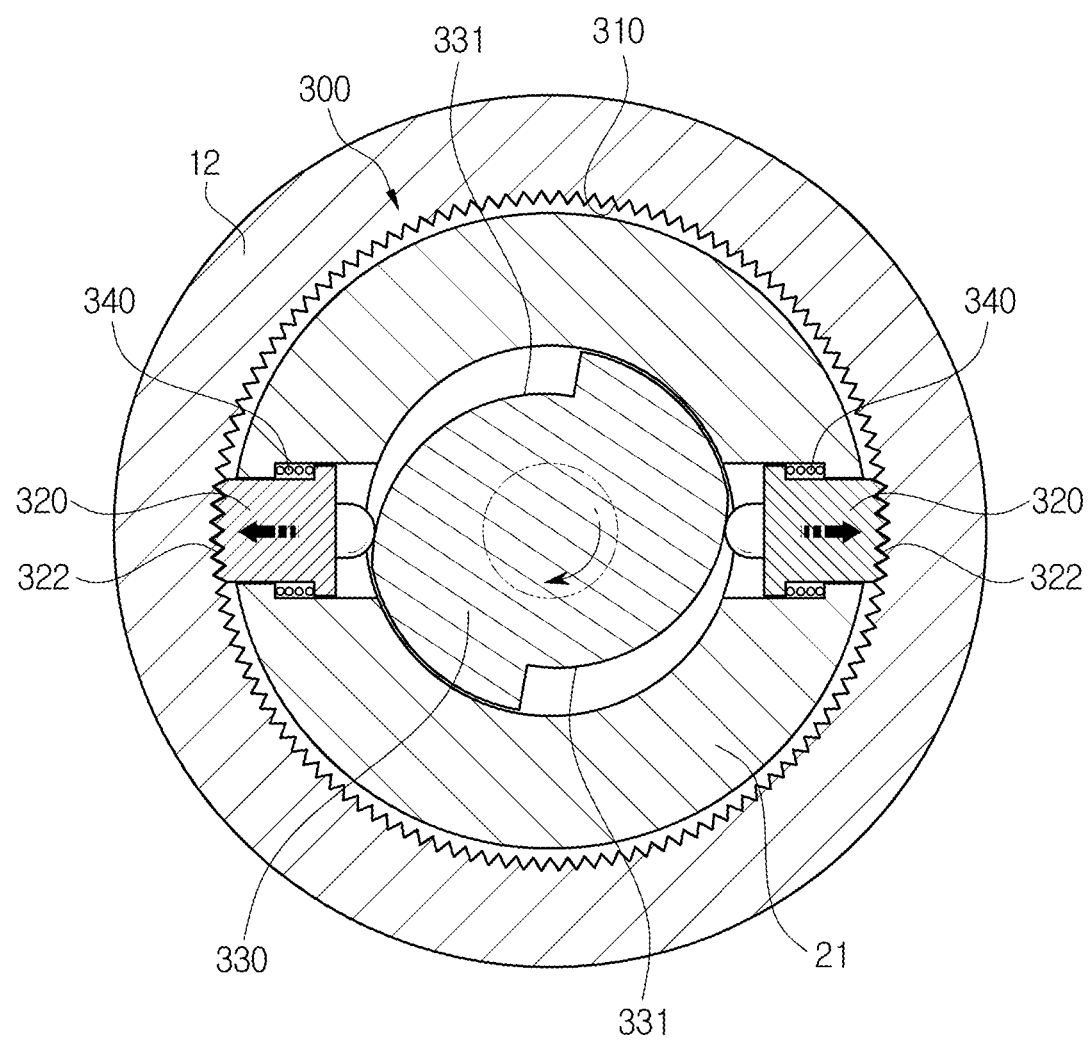
FIG. 9 is a cross-sectional view taken along line C-C' in FIG. 7, illustrating a state in which the rotation of the steering shaft is limited.

FIG. 7, FIG. 8 and FIG. 9 illustrate a steering limiting device 300 according to various exemplary embodiments. The steering limiting device 300 of the various exemplary embodiments may include a first locking portion 310, a plurality of locking members 320, a rotation member 330, a plurality of pressing springs 340, and a driving motor 350.

The first locking portion 310 is provided on the internal surface of the cylindrical shaft support portion 12 for rotatably supporting the steering shaft 21. The first locking portion 310 is continuously provided along the rotation direction of the steering shaft 21 and may be formed in a concave-convex shape (tooth shape).

The plurality of locking members 320 is provided inside the steering shaft 21 to be movable forwards or backwards in the radial direction thereof. Each of the plurality of locking members 220 includes a second locking portion 322 provided in a shape corresponding to the first locking portion 310 to be correspondingly caught on the first locking portion 310 in a state of protruding from the steering shaft 21.

The rotation member 330 is rotatably provided in the internal space of the steering shaft 21 and includes a plurality of cam surfaces 331 provided on an external surface thereof to move the plurality of locking members 320 forwards and backwards during rotation.

The plurality of pressing springs 340 may be provided on the outside of the plurality of locking members 320 and press the plurality of locking members 320, respectively, toward the cam surface 331 of the rotation member 330 to separate the first locking portion 310 and the second locking portion 322 from each other.

The driving motor 350 is provided in the steering shaft 21 to rotate the rotation member 330 in a forward or reverse direction to move the plurality of locking members 320 forwards and backwards thereof.

In the steering limiting device 300 of the various exemplary embodiments of the present invention, as illustrated in FIG. 8, when the rotation member 330 rotates counterclockwise by the operation of the driving motor 350, the plurality of locking members 320 enters the inside of the steering shaft 21. Therefore, in the instant case, because the second locking portion 322 of each of the locking members 320 is maintained in a state of being spaced from the first locking portion 310, the steering shaft 21 may rotate. When the personal mobility is normally used, the steering limiting device 300 may maintain the state of FIG. 8.

In the steering limiting device 200, when an emergency situation such as a sudden rotation of the main body 10 occurs, as illustrated in FIG. 9, the rotation member 330 rotates clockwise by the operation of the driving motor 350 so that the plurality of locking members 320 protrudes to the outside of the steering shaft 21. Accordingly, in the instant case, as the second locking portion 322 of each of the locking members 320 is correspondingly coupled to the first locking portion 310, the rotation of the steering shaft 21 may be limited.

Although the various exemplary embodiments exemplify a case in which two of the locking members 320 are provided symmetrically on opposite sides, the one or more locking members 320 may be provided.

In the personal mobility of the various exemplary embodiments of the present invention, as illustrated in FIG. 7, the controller 70 may control the operation of the driving motor 350 by controlling the operation of the motor driving device 75 based on the detection of the posture sensor 60 provided on the main body 10 or the like of the personal mobility. Therefore, the personal mobility to which the steering limiting device 300 of the various exemplary embodiments is applied may also prevent rapid rotation of the main body 10 with respect to the steering shaft 21, preventing damage such as injury to the user because the personal mobility may limit the rotation of the steering shaft 21 by detecting an emergency situation in which the main body 10 rapidly rotates around the steering shaft 21 due to sudden braking or an accident, etc.

Figure 10:
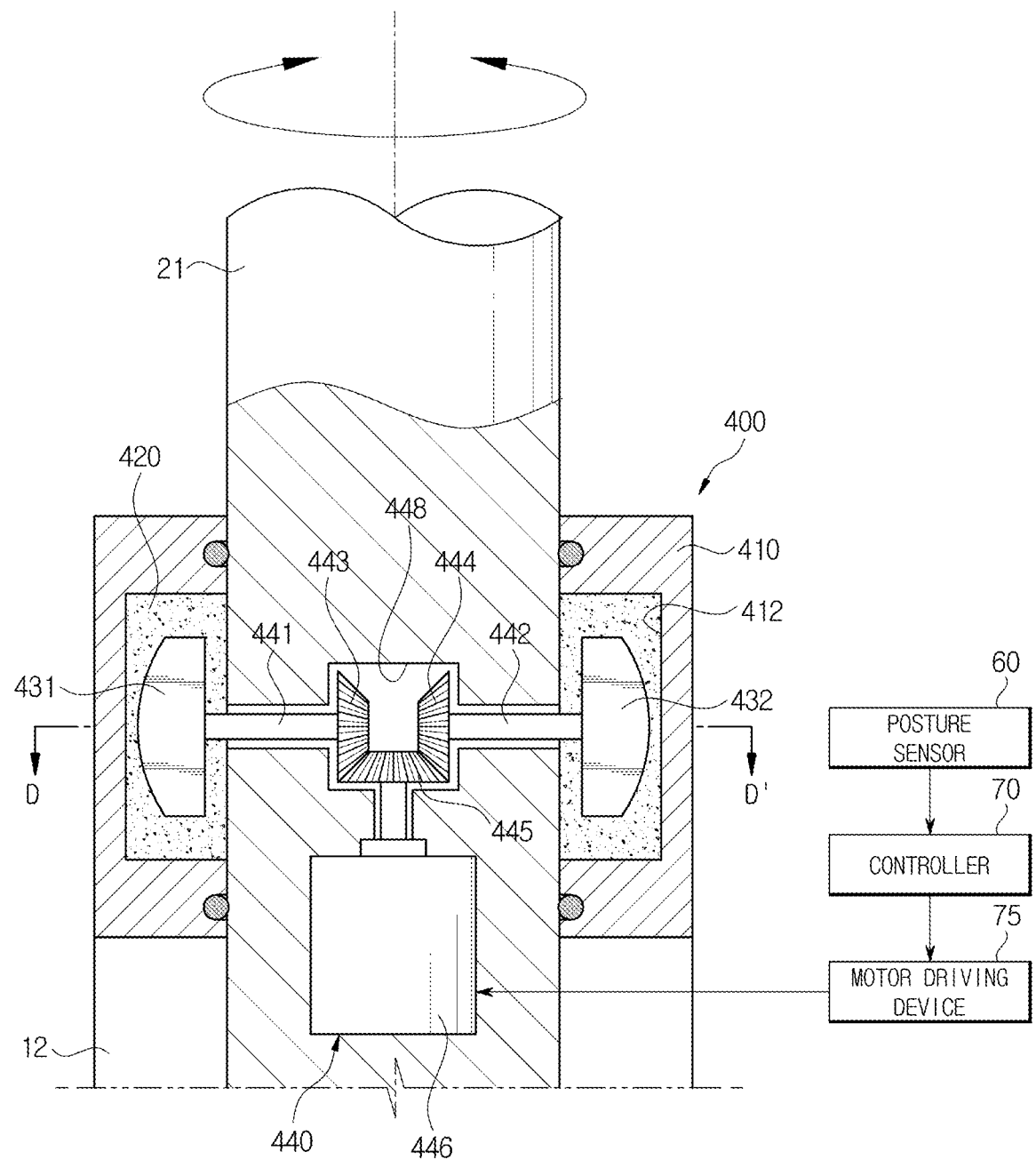
FIG. 10 is a cross-sectional view of a steering limiting device of a personal mobility according to various exemplary embodiments of the present invention.
Figure 11:
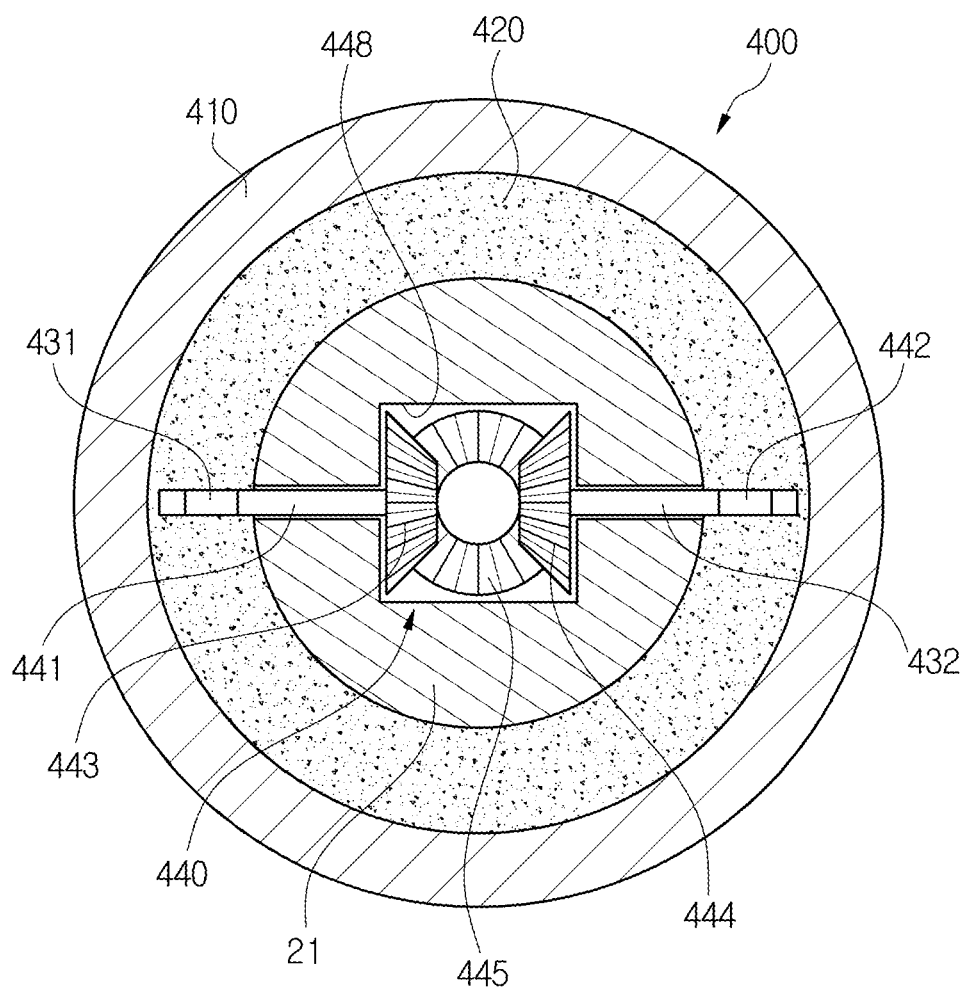
FIG. 11 is a cross-sectional view taken along line D-D' in FIG. 10, illustrating a state in which the rotation of a steering shaft is limited.
Figure 12:
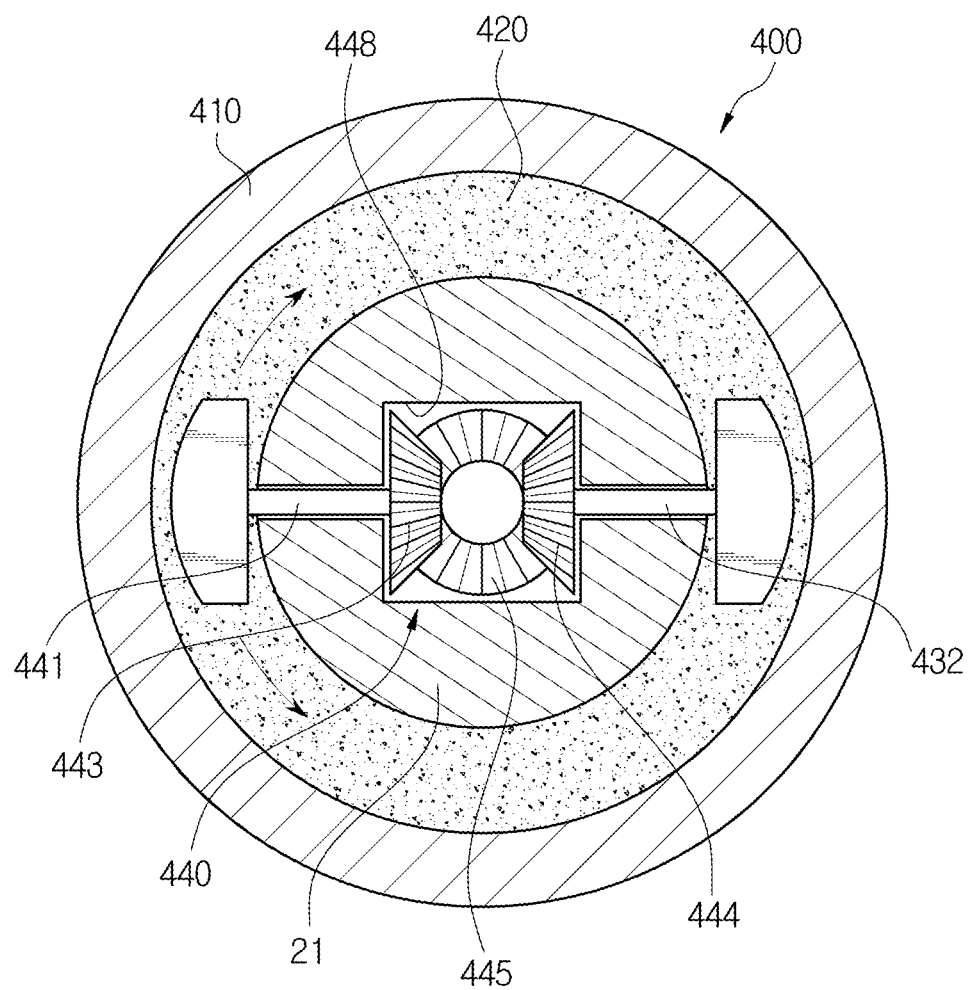
FIG. 12 is a cross-sectional view taken along line D-D' in FIG. 10, illustrating a state in which the steering shaft is rotatable.

FIG. 10, FIG. 11, and FIG. 12 illustrate a steering limiting device 400 according to various exemplary embodiments. The steering limiting device 400 of the various exemplary embodiments may include a housing 410, a fluid accommodating groove 412, a viscoelastic fluid 420, a first braking wing 431, a second braking wing 432, and a driving device 440.

The housing 410 may be provided in a cylindrical shape as in the various exemplary embodiments and may be provided outside the steering shaft 21 to enclose the circumference of the steering shaft 21. A lower portion of the housing 410 is fixed to the upper portion of the shaft support portion 12 of the main body 10.

The fluid accommodating groove 412 is provided in a cylindrical shape in the housing 410 such that a side thereof facing the external surface of the steering shaft 21 inside the housing 410 is open. The viscoelastic fluid 420 is filled in the fluid accommodating groove 412. The viscoelastic fluid 420 is a material that maintains a liquid property when a small external force is gradually applied thereto, like oobleck, but changes into a solid property when a large external force is suddenly applied thereto.

The first and second braking wings 431 and 432 are respectively provided on opposite external sides of the steering shaft 21 to be submerged in the viscoelastic fluid 420 inside the fluid accommodating groove 412. The first and second braking wings 431 and 432 may limit the rotation of the steering shaft 21 by rotating such that opposite side surfaces thereof face the rotation direction of the steering shaft 21 as illustrated in FIG. 10, and FIG. 11, or may allow the rotation of the steering shaft 21 by rotating such that the opposite side surfaces thereof face a direction of intersecting the rotation direction of the steering shaft 21 as illustrated in FIG. 12.

The driving device 440 is provided inside the steering shaft 21. The driving device 440 may rotate the first and second braking wings 431 and 432 under a braking condition as illustrated in FIG. 11 or a braking release condition as illustrated in FIG. 12. The driving device 440 may include a first wing shaft 441, a second wing shaft 442, a first driven gear 443, a second driven gear 444, a driving gear 445, and a driving motor 446.

The first wing shaft 441 and the second wing shaft 442 extend toward a center portion of the steering shaft 21 from the first and second braking wings 431 and 432, respectively, to be rotatably supported on the steering shaft 21.

The first driven gear 443 is provided in a gear chamber 448 inside the steering shaft 21 in a state of being coupled to the first wing shaft 441, and the second driven gear 444 is provided in the gear chamber 448 in a state of being coupled to the second wing shaft 442. The driving gear 445 is provided in the gear chamber 448 such that opposite sides thereof are engaged with the first and second driven gears 443 and 444. The driving motor 446 is provided inside the steering shaft 21 and may rotate the driving gear 445 in forward and reverse directions. The first driven gear 443, the second driven gear 444, and the driving gear 445 may be configured as bevel gears.

In the steering limiting device 400 of the various exemplary embodiments of the present invention, when an emergency situation such as a sudden rotation of the main body 10 of the personal mobility occurs, as illustrated in FIG. 10, and FIG. 11, by the operation of the driving motor 446, the first and second braking wings 431 and 432 rotate under the braking condition in which the opposite side surfaces of the first braking wing 431 and the second braking wing 432 face the rotation direction of the steering shaft 21, limiting the rotation of the steering shaft 21. As illustrated in FIG. 11, because a large rotational resistance acts on the first and second braking wings 431 and 432 when the first and second braking wings 431 and 432 rotate under the braking condition, the steering limiting device 400 may limit the rotation of the steering shaft 21.

In the steering limiting device 400 of the various exemplary embodiments of the present invention, when the personal mobility is normally used, as illustrated in FIG. 12, by the operation of the driving motor 446, the first and second braking wings 431 and 432 rotate under the braking release condition in which the opposite side surfaces of the first and second braking wings 431 and 432 face a direction of intersecting the rotation direction of the steering shaft 21, allowing the rotation of the steering shaft 21. As illustrated in FIG. 12, because the rotational resistance acting on the first and second braking wings 431 and 432 is minimized when the first and second braking wings 431 and 432 rotate under the braking release condition, the steering limiting device 400 may allow the rotation of the steering shaft 21.

In the steering limiting device 400 of the various exemplary embodiments of the present invention, as illustrated in FIG. 10, the controller 70 may control the operation of the driving motor 446 by controlling the operation of the motor driving device 75 based on the detection of the posture sensor 60 provided on the main body 10 of the personal mobility. Therefore, the personal mobility to which the steering limiting device 400 of the various exemplary embodiments are applied may also prevent rapid rotation of the main body 10 with respect to the steering shaft 21, preventing damage such as injury to the user because the personal mobility may limit the rotation of the steering shaft 21 by detecting an emergency situation in which the main body 10 rapidly rotates around the steering shaft 21 due to sudden braking or an accident, etc.

As is apparent from the above, in a personal mobility according to various exemplary embodiments of the present invention, when an emergency situation is detected in which a main body rotates rapidly around a steering shaft due to a sudden braking or an accident, a steering limiting device can limit the rotation of the steering shaft to prevent the rapid rotation of the main body with respect to the steering shaft in the emergency situation. Therefore, damage such as injury to a user may be prevented.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips.

Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A personal mobility comprising:
a main body;
a steering shaft rotatably coupled to the main body;
a steering limiting device configured to limit rotation of the steering shaft;
a posture sensor provided to detect a change in posture of the main body; and
a controller configured to selectively generate a control signal to control an operation of the steering limiting device to limit the rotation of the steering shaft when the controller determines that the posture of the main body changes at a speed exceeding a predetermined speed,
wherein the steering limiting device includes:
a housing provided on a shaft support portion connected to the main body for rotatably supporting the steering shaft and enclosing a circumference of the steering shaft, wherein the housing includes a fluid accommodating groove opened toward an external surface of the steering shaft;
a magneto-rheological (MR) fluid accommodated in the fluid accommodating groove;
one or more protrusions protruding from the external surface of the steering shaft and positioned in the fluid accommodating groove; and
an excitation coil provided in the housing to selectively provide a magnetic field to the MR fluid according to the control signal of the controller.

2. The personal mobility of claim 1, wherein the MR fluid changes into a solid property to limit the rotation of the steering shaft when a current is applied to the excitation coil according to the control signal of the controller to generate the magnetic field.

3. The personal mobility of claim 2, wherein the controller is configured to control the current applied to the excitation coil according to the detection of the posture sensor.

4. A personal mobility comprising:
a main body;
a steering shaft rotatably coupled to the main body;
a steering limiting device configured to limit rotation of the steering shaft;
a posture sensor provided to detect a change in posture of the main body; and
a controller configured to selectively generate a control signal to control an operation of the steering limiting device to limit the rotation of the steering shaft when the controller determines that the posture of the main body changes at a speed exceeding a predetermined speed,
wherein the steering limiting device includes:
a first locking portion provided on an internal surface of a shaft support portion along a rotation direction of the steering shaft, wherein the shaft support portion is connected to the main body for rotatably supporting the steering shaft;
one or more locking members provided inside the steering shaft to be movable forwards or backwards in a radial direction of the steering shaft and including a second locking portion provided at a distal end portion of the one or more locking members to be selectively caught on the first locking portion;
one or more pressing elastic members provided to elastically bias the one or more locking members toward the first locking portion;
a rotation member rotatably provided in the steering shaft;
one or more traction members provided to connect the rotation member and the one or more locking members and configured for pulling the one or more locking members by a rotation of the rotation member; and
a driving motor configured to rotate the rotation member fixed to the driving motor in a forward or reverse direction according to the control signal of the controller.

5. The personal mobility of claim 4, wherein the first locking portion is in a concave-convex shape.

6. The personal mobility of claim 4, wherein the controller is configured to control the operation of the driving motor based on the detection of the posture sensor.

7. The personal mobility of claim 4, wherein the driving motor is provided in the steering shaft.

8. A personal mobility comprising:
a main body;
a steering shaft rotatably coupled to the main body;
a steering limiting device configured to limit rotation of the steering shaft;
a posture sensor provided to detect a change in posture of the main body; and
a controller configured to selectively generate a control signal to control an operation of the steering limiting device to limit the rotation of the steering shaft when the controller determines that the posture of the main body changes at a speed exceeding a predetermined speed,
wherein the steering limiting device includes:
a first locking portion provided on an internal surface of a shaft support portion along a rotation direction of the steering shaft, wherein the shaft support portion is connected to the main body for rotatably supporting the steering shaft;
one or more locking members provided inside the steering shaft to be movable forwards or backwards in a radial direction of the steering shaft and including a second locking portion provided at a distal end portion of the one or more locking members to be selectively caught on the first locking portion;
a rotation member rotatably provided in the steering shaft and provided with one or more cam surfaces on an external surface of the rotation member to move the one or more locking members forwards or backwards during rotation of the rotation member;
one or more pressing elastic members provided to elastically bias the one or more locking members toward the one or more cam surfaces of the rotation member; and
a driving motor configured to rotate the rotation member fixed to the driving motor in a forward or reverse direction according to the control signal of the controller.

9. The personal mobility of claim 8, wherein the first locking portion is in a concave-convex shape.

10. The personal mobility of claim 8, wherein the driving motor is provided in the steering shaft.

11. A personal mobility comprising:
a main body;
a steering shaft rotatably coupled to the main body;
a steering limiting device configured to limit rotation of the steering shaft;
a posture sensor provided to detect a change in posture of the main body; and
a controller configured to selectively generate a control signal to control an operation of the steering limiting device to limit the rotation of the steering shaft when the controller determines that the posture of the main body changes at a speed exceeding a predetermined speed,
wherein the steering limiting device includes:
a housing provided on a shaft support portion connected to the main body for rotatably supporting the steering shaft and enclosing a circumference of the steering shaft, wherein the housing includes a fluid accommodating groove opened toward an external surface of the steering shaft;
a viscoelastic fluid accommodated in the fluid accommodating groove;
one or more braking wings provided outside the steering shaft, positioned within the fluid accommodating groove and rotatably coupled to the steering shaft; and
a driving device configured to rotate the one or more braking wings under a braking condition or a braking release condition according to the control signal of the controller.

12. The personal mobility of claim 11, wherein opposite side surfaces of the one or more braking wings face a rotation direction of the steering shaft or face a direction of intersecting the rotation direction of the steering shaft.

13. The personal mobility of claim 11, wherein the one or more braking wings include a first braking wing and a second braking wing provided on opposite sides of the steering shaft, respectively, and
wherein the driving device includes:
first and second wing shafts extend toward a center portion of the steering shaft from the first and second braking wings, respectively, to be rotatably supported on the steering shaft;
a first driven gear fixed to the first wing shaft and provided in a gear chamber inside the steering shaft;
a second driven gear fixed to the second wing shaft and provided in the gear chamber;
a driving gear provided in the gear chamber to be gear-engaged with the first and second driven gears; and
a driving motor configured to rotate the driving gear in a forward or reverse direction thereof according to the control signal of the controller.

14. The personal mobility of claim 13, wherein the driving motor is provided in the steering shaft.

* * * * *